United States Patent [19] [11] 4,032,675
Irie et al. [45] June 28, 1977

[54] METHOD FOR PRODUCING COATED ELECTRICAL STEEL SHEETS HAVING EXCELLENT PUNCHABILITY, WELDABILITY, ELECTRICAL INSULATION AND HEAT RESISTANCE

[75] Inventors: Toshio Irie, Chiba; Toshikuni Tanda, Akashi; Tomoyuki Ichi, Ashiya; Toshio Sadayori, Chiba, all of Japan

[73] Assignee: Kawasaki Steel Corporation, Kobe, Japan

[22] Filed: Oct. 14, 1975

[21] Appl. No.: 621,740

[30] Foreign Application Priority Data

Oct. 15, 1974  Japan .............................. 49-117646

[52] U.S. Cl. ................................ 427/126; 148/6.2; 427/104; 427/388 C
[51] Int. Cl.² ...................... B05D 3/02; B05D 5/12; B05D 7/14
[58] Field of Search ............ 427/388, 58, 126, 104; 148/6, 6.2

[56] References Cited

UNITED STATES PATENTS

| | | | |
|---|---|---|---|
| 2,902,390 | 9/1959 | Bell | 427/388 |
| 3,053,691 | 9/1962 | Hartman et al. | 427/388 |
| 3,053,692 | 9/1962 | Pocock | 427/388 |
| 3,632,362 | 1/1972 | Urushiyama et al. | 427/388 X |

Primary Examiner—James R. Hoffman

[57] ABSTRACT

Coated electrical steel sheets having excellent punchability, weldability and insulation resistance are produced by applying an electrical steel sheet with a treating dispersion obtained by compounding the particle separating resin emulsion and the compatible resin to an aqueous solution containing chromic acid in the particularly defined amount and baking the thus applied steel sheets. To the treating dispersion may be added saccharides or polyhydric alcohols as a reducing agent or boric acid or phosphoric acid.

13 Claims, 10 Drawing Figures

FIG_5

METHOD FOR PRODUCING COATED ELECTRICAL STEEL SHEETS HAVING EXCELLENT PUNCHABILITY, WELDABILITY, ELECTRICAL INSULATION AND HEAT RESISTANCE

The present invention relates to a method for producing coated electrical steel sheets having excellent punchability, weldability, electrical insulation and heat resistance.

The electrical steel sheets are applied with insulating coating and the coated sheets must have excellent heat resistance, corrosion resistance and resistance for refrigerant, such as Freon gas (Trademark) as well as electrical insulation. Furthermore, the coated sheets are expected to have improved punchability. In addition, the coated sheets must not form blowholes in the weld bead when a side of electrical steel sheet laminate is TIG (Tungsten Inert Gas) welded. That is, a high degree of weldability of the coated electrical steel sheets is required.

These properties are mainly provided by the insulating coating and the insulating coating for the electrical steel sheet is roughly classified into four classes i.e., phosphate type, chromate type, organic resin type and chromate-organic resin mixture type. The characteristics of the steel sheets applied with these coatings are briefly explained as follows.

1. Phosphate type

This coating has been disclosed in U.S. Pat. No. 2,501,846 and U.S. Pat. No. 2,753,282 and classified as C-4 in AISI Standard. The weldability is excellent but the punchability cannot be improved. The insulation resistance depends upon the thickness of the coating but when the coating becomes thick, the coating is readily exfoliated by a heat treatment, such as a stress relief annealing.

2. Chromate type.

This coating has been disclosed in U.S. Pat. No. 3,591,425. The punchability is good but the weldability is not very satisfactory. The insulation resistance is fairly high but is considerably decreased by a stress relief annealing.

3. Organic resin type.

This coating is classified as C-1 or C-3 in AISI Standard. The punchability and electrical insulation are fairly satisfactory but this coating is composed of an organic substance, so that the heat resistance is poor and when welding, a large amount of gas is evolved and blowholes are formed in the bead and when a stress relief annealing is effected, the coating is burnt or carbonized.

4. Chromate-organic resin mixture type

This type coating has been mainly disclosed in U.S. Pat. No. 3,666,568, which is composed of double layer coatings of a chromate and an organic resin. In addition, there has been a process wherein a mixture solution of a chromate and an organic resin is coated and then baked. The punchability is particularly excellent and 1,000,000 times punching can be conducted per one time grinding of a tool steel die. Some coatings are high in insulation resistance but the weldability is generally not satisfactory. Furthermore, the insulation property after an annealing is low.

Thus, the coatings heretofore used do not provide all of the properties of insulation resistance, punchability, weldability and heat resistance. Proposals for improving these properties has been made but it has never been possible to satisfy all these requirements.

For example, it has been proposed as a method for improving the weldability of the organic resin type coating having an excellent punchability that before previously applying the insulating coating, a surface roughness of more than 20 $\mu$ inch Hrms is provided on the steel sheet surface and then the insulating coating is applied to provide a moderate roughness on the surface of the formed electrical steel sheet, whereby the gas evolved from the weld bead escapes. However, in this method, the thickness of the coating at the convex portion of the steel sheet is extremely thin and the electrical insulation at such portion is lowered. Furthermore, the punching of the steel sheet depends upon the thickness of the coating, so that the punchability of the steel sheet provided with the coating having such extremely thin portions is poor.

As a method for producing an electrical steel sheet in which these defects are obviated and which has an excellent weldability, it has been proposed in Japanese Pat. No. 19,078/74 a coating having a moderate roughness is applied on a smooth surface of a steel sheet. In this method, a treating dispersion containing bakelite resin or malamine resin having a particle size of more than 2 $\mu$ is coated on a steel sheet and baked, but the particle size of the resin powders is generally coarse and it is difficult to obtain fine powders of less than 10 $\mu$, so that in this method, the surface roughness of the coating is extremely large and the space factor is considerably decreased. In addition, according to this method, the resin particles, when subjected to annealing (stress relief annealing), are burnt or carbonized and the insulative effect of the coating is decreased substantially.

The present invention provides a method for producing an electrical steel sheet having excellent electrical insulation, heat resistance, punchability and weldability, in which the defects of such conventional processing can be obviated. The defects can be obviated by applying a treating liquid in which fire particles are suspended and which is obtained by compounding to an aqueous solution containing chromic acid a resin emulsion which separates fine agglomerated particles when compounded in said aqueous solution, on a steel sheet surface and baking the coated steel sheet to form a coating formed having a large surface roughness wherein the particles containing the resin and chromic acid are dispersed.

The technical characteristics of the present invention becomes apparent from the claims and the following detailed explanation but is briefly explained as follows.

The present invention is characterized in that a treating dispersion obtained by compounding a resin emulsion which separates agglomerated particles having an average particle diameter of 3–40 $\mu$ when such a resin emulsion is compounded in an aqueous solution containing chromic acid and a resin having a compatibility to an aqueous solution containing chromic acid, to the aqueous solution containing chromic acid in such an amount that the total amount of the nonvolatile component of both the above resins is 5–150 parts by weight based on 100 parts by weight of chromic acid ($CrO_3$), and an amount of the nonvolatile component of the former resin emulsion to separate the agglomerated particles is at least 1 part by weight among the above described total amount and is at least 5% by weight based in the total amount of the nonvolatile fraction of both the above resins, is coated on an electrical steel sheet and then baked.

The first object of the present invention is to provide the electrical steel sheet coated with a coating having an excellent punchability, so that the fundamental composition of the treating liquid is composed of chromic acid and an organic resin as publicly known. In order that these two components are applied by one time coating and subsequent baking to form the coating, chromic acid and the resin must coexist in an aqueous solution form or a suspension form. The inventors have made the following test to find the resins capable of coexisting with chromic acid.

To 100 ml of an aqueous solution of calcium dichromate of a concentration of 18% (14% as $CrO_3$) was added 10 ml of a resin aqueous solution or a resin emulsion having a concentration of nonvolatile matter of 15–25% in 5–10 seconds while stirring the aqueous solution of calcium dichromate.

The formed liquids are roughly divided into the following two classes.

1. The resin is not substantially dissolved in the aqueous solution of chromate and the liquid is separated into two layers or macro-agglomerates having a diameter of more than several mm are formed.

2. The resin is completely dissolved in the aqueous solution of calcium dichromate to form an opaque orange solution and even if said liquid is left to stand for several hours, no change is observed.

However, when a further test has been made with respect to a large number of resins, the following type resin has been found.

3. Fine agglomerates are formed and a suspension is obtained.

If this suspension is left to stand for about 30 minutes, the agglomerates precipitate and a transparent portion not containing resin is formed at the upper portion of the vessel.

Any one of the resins classified to this class (3) are an emulsion type resin and are referred to as "particle separating resins" in the present invention. The resins belonging to the above class (2) are also an emulsion type resin and are preferred to as "compatible resins".

The present invention can provide the electrical steel sheets having excellent insulation resistance and weldability by applying a treating dispersion suspending fine particles obtained by compounding particularly defined amounts of the particle separating resin and the compatible resin to chromaic acid, on electrical steel sheets and baking the thus applied steel sheet to form coatings. Furthermore, the formed insulating coatings adhere tightly to the electrical steel sheets and even if a stress relief annealing is carried out, the adhesion is not varied and the insulation resistance is still high.

As the particle separating resins to be used herein, the following resins are preferable.

Usually, the particle size of an emulsion is ultra-fine of less than 1 $\mu$ but in the present invention, such an emulsion is utilized that when the resin emulsion is added to the aqueous solution of chromate, the agglomerates having a diameter of several microns to several ten microns are separated.

In the present invention, it is preferred that the particle size distribution of the agglomerates measured by the specific gravimeter method and the photosedimentation method, is 3–40 $\mu$ in mode size diameter (particle size showing the highest point of peak of the particle size distribution curve) or median size diameter (particle size corresponding to the center cumulative value (50%) of the cumultive curve). When the average particle size is less than 3 $\mu$, the surface roughness of the formed coating is small and the weldability cannot be remarkably improved and when the average particle size exceeds 40 $\mu$, the dispersion is not satisfactory and the particles are precipitated on the bottom of the treating vessel and the amount of the particles not effectively used becomes large.

The invention is described below with reference to the drawings, in which the FIGURES are as follows.

Figure 1:
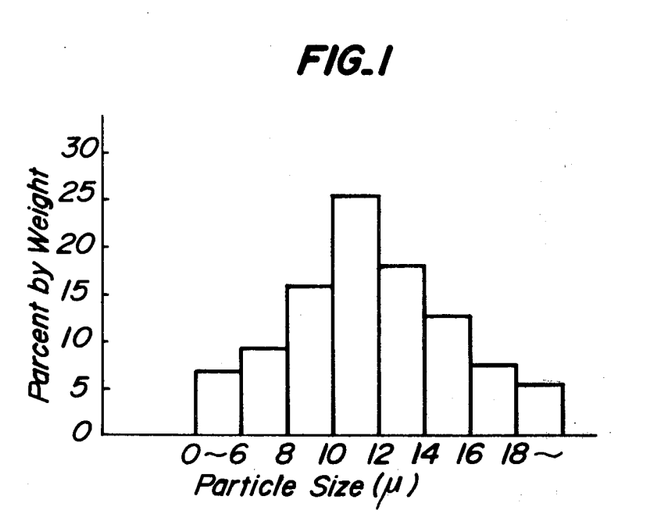
FIG. 1, illustrates a graph showing the preferably particle size distribution of the agglomerates.

An embodiment of the preferable particle size distribution of the agglomerates is shown in FIG. 1. When the suspension dispersing the agglomerates having such a particle size is coated on an electrical steel sheet and baked, flat projections having a height of 2–10 $\mu$ and a diameter of 3–50 $\mu$ are formed and a moderate roughness is provided on the coating and the weldability and the insulation resistance can be improved.

As the resin emulsion which forms such agglomerates, for example, the following acrylic resin emulsion is preferable. 5–13 parts by weight of $\alpha,\beta$-ethylenically unsaturated carboxylic acid, such as methacrylic acid and 95–87 parts by weight of $\alpha,\beta$-ethylenical monomer, such as methyl methacrylate are copolymerized together with at least one emulsifier to form a resin emulsion. 0.8–5.5 parts by weight of a water soluble amine, based upon one hundred parts by weight of non volatile matter in the resin emulsion, is then added.

The resin composition described above has been determined by a large number of tests and when the ranges defined herein are not satisfied, the agglomerated particles are not formed or when the amine is added, the viscosity is extremely increased and such a composition is not preferable.

However, the resins to be used in the present invention are not limited to the above mentioned acrylic resin and any resin which forms the given agglomerated particles by the same test as described above, can be used. However, the concentration of the nonvolatile matter of the particle separating resin in the emulsion is important and is preferred to be 5–60%. When the concentration of the nonvolatile matter is less than 5%, even if such a resin emulsion is compounded to the aqueous solution containing chromic acid, the agglomerates having an average particle size of not less than 3

μ are not formed and when the concentration is more than 60%, the macro-agglomerates are formed and such a concentration is not preferable.

On the other hand, the compatible resins are ones belonging to the above described class (2) but in the case of acrylic resin, the resin in which $\alpha,\beta$-ethylenically unsaturated carboxylic acid is less than 5 parts by weight and the water soluble amine is less than 0.5 part by weight, is preferably. However, the compatible resin is not limited to the acrylic resin and any resins which are completely dissolved to form an opaque orange solution, which does not show variation even after left to stand for several hours, when said resins are added to the aqueous solution containing chromic acid, may be used and at least one of vinyl resin, amino resin, alkyd resin, melamine resin, silicone resin and styrene resin may be used.

The mixture ratio of chromic acid and the resins, when the coating of the present invention is formed by using the particle separating resin and the compatible resin, is as follows. Namely, it is necessary that the total amount of the nonvolatile matter of the particle separating resin and the compatible resin is 5–150 parts by weight based on 100 parts by weight of chromic acid and that the amount of the nonvolatile matter of the particle separating resin is at least 1 part by weight among the above described total amount and further is at leat 5% by weight based on the total amount of the nonvolatile matters of both the particle separating resin and the compatible resin. These requirements are based on the following experimental data.

When the total amount of the nonvolatile matter of both the resins based on 100 parts by weight of chromic acid is less than 5 parts, the punchability is not improved. While, when said amount exceeds 150 parts, the ratio of the resins in the coating becomes too large, so that when stress relief annealing is effected, the film is carbonized and consequently the insulation resistance of the steel sheet becomes insufficient. Moreover, the punchability is deteriorated and even if any resin is selected, the weldability is deteriorated.

The punchability and the insulation resistance can be insured by selecting the total amount of the nonvolatile matter of the particle separating resin and the compatible resin as defined above but the insurance of the weldability and the further improvement of the insulation resistance and the heat resistance can be accomplished by compounding the particle separating resin in an appropriate amount. That is, among the above mentioned amount of 5–150 parts of both the resins, at least 1 part by weight is occupied by the particle separating resin and further the amount of the nonvolatile matter of the particle separating resin is at least 5% based on the total amount of the nonvolatile matters of both the resins.

Even when the compatible resin is not used at all, the steel sheets with a coating having a large surface roughness and sufficient punchability and weldability can be obtained by compounding 5–150 parts by weight of the particle separating resin.

However, if the chromic acid treating dispersion containing a large amount of particle separating resin is coated on an electrical steel strip industrially in a high speed, stripe patterns having a width of several millimeters may be formed. These stripe patterns are observed when the treating liquid dispersing particles is poured on the steel sheet surface or the steel strip is dipped in said treating liquid and then the steel strip applied with the treating liquid is squeezed by grooved rolls to adjust the coating amount, as a process for coating said treating liquid, and when the rate of the steel strip to be coated becomes fast, the stripe patterns are liable to be formed on the steel sheet surface in contact with the lower squeezing roll. The distance between the stripes with each other is several centimeters to several ten centimeters and the appearance of the product is deteriorated.

In order to prevent the formation of the stripe patterns, the inventors have checked the composition of a treating liquid and as the result, it has been found that if the amount of the nonvolatile matter of the particle separating resin is limited to less than 30 parts by weight based on 100 parts by weight of chromic acid, no stripe patterns are formed even if the coating is conducted at a high rate. Furthermore, it has been found that when the compatible resin is added to the aqueous solution containing chromic acid in an amount of the nonvolatile matter of said resin being not less than 5 parts by weight based on 100 parts by weight of chromic acid, the punchability is improved.

Figure 2:
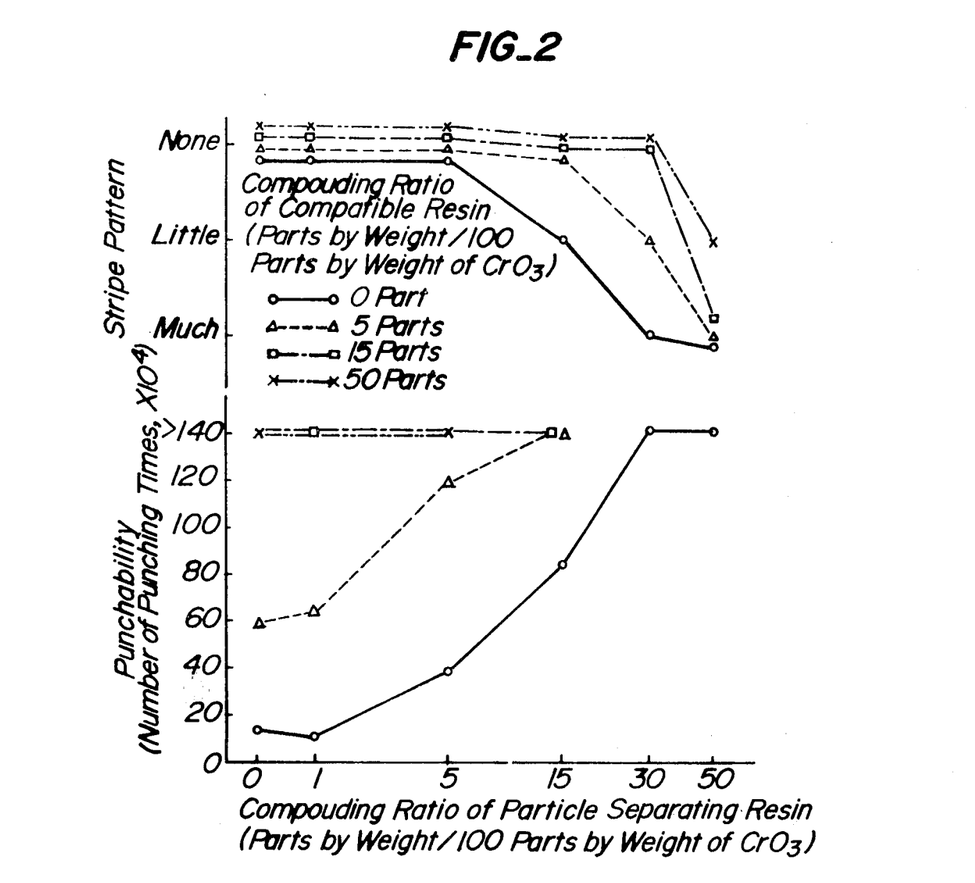
FIG. 2, illustrates a graph showing the relationship between the compounding ratios of particle separating resin and of compatible resin, to punchability and stripe pattern respectively.
Figure 3:
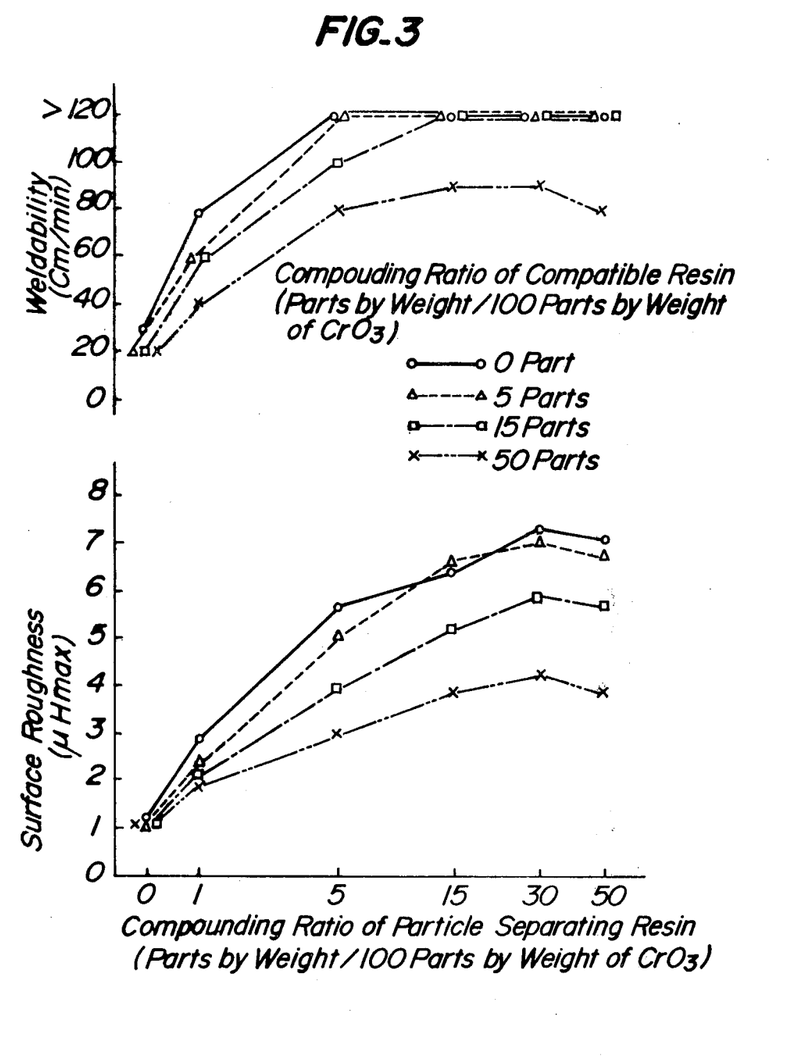
FIG. 3, illustrates a graph showing the relationship between the compounding ratios of particle separating resin, of compatible resin to the surface roughness and weldability respectively.
Figure 4A:
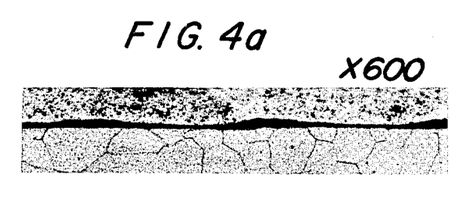
FIGS. 4a to 4d illustrate photographs of the cross-section and surface of the coatings obtained in Examples 1 and 2 (magnified 600 and 100 times, respectively) according to the present invention.
Figure 4B:
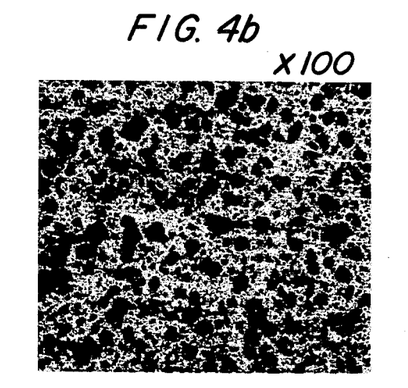
Figure 4C:
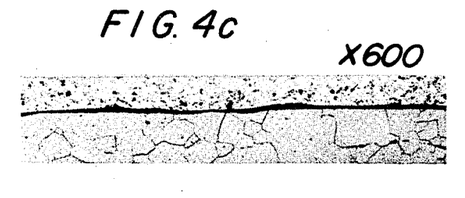
Figure 4D:
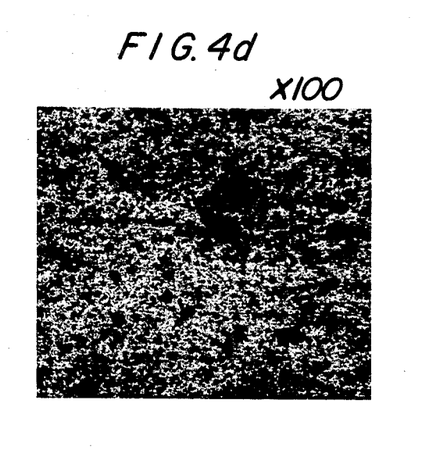
Figure 4E:
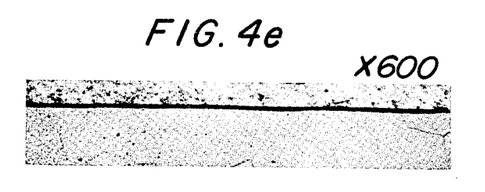
FIGS. 4e and 4f illustrate photographs of the cross-section and surface of the conventional coatings, obtained in comparative Examples 1 and 2 (magnified 600 and 100 times, respectively).
Figure 4F:
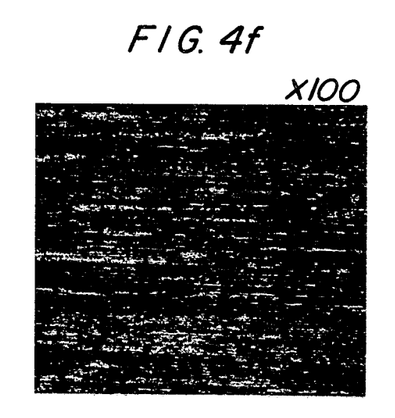

FIGS. 2 and 3 show the relation of the compounding ratio of the particle separating resin and the compatible resin to the stripe pattern and surface roughness of the formed coating, and the punchability and weldability of the coated steel sheets. The steel strip, the treating liquids, the coating and baking conditions, and the test method are as follows.

Steel strip:
   0.4% silicon steel strip.
   Surface roughness 1 $\mu H_{max}$.

Treating liquid:
   calcium dichromate + ethylene glycol.
   Compounding ratio of the resins are the weight ratio of the nonvolatile matter of the resins based on 100 parts by weight of chromic acid.

Particle separating resin:
   acrylic resin emulsion.

Compatible resin:
   acrylic resin emulsion.

Coated amount:
   2–5 g/m$^2$ (per one side after baking).

Baking:
   400° C, 1 minute.

Stripe pattern:
   Formation degree when the coating is carried out at a rate of 60 m/min.

Weldability:
   Compressing pressure — 100 kg/cm$^2$
   Current — 100A — No groove.
   Maximum welding rate when blowholes are not formed.

Punchability:
   15 mm$\phi$ disc punching, using steel die.
   Punched times until the burr height reaches 50 $\mu$.

The formation of the stripe patterns becomes gradually remarkable, in the case of no addition of the compatible resin, when the amount of the particle separating resin exceeds 15 parts by weight based on 100 parts by weight of $CrO_3$. If the compatible resin is compounded, the tendency for forming the stripe patterns is reduced and when more than 15 parts by weight of the compatible resin is compounded, even if a treating liquid compounded with 30 parts by weight of the particle separating resin is coated at a rate of 60 m/min, the stripe patterns are not formed but if said resin is compounded in an amount of more than 50 parts by weight, the formation of the stripe patterns cannot be avoided. Accordingly, when it is desired not to form the stripe patterns, the amount of the particle separating resin is limited to less than 30 parts based on 100 parts by weight of $CrO_3$.

On the other hand, when 1 part by weight based on 100 parts by weight of $CrO_3$, of the particle separating resin is compounded, the surface roughness of the formed film becomes large and the weldability of more than 60 cm/min can be obtained and when 5 parts by weight is compounded, the weldability of a high rate of more than 100 cm/min can be obtained. However, when the amount exceeds 15 parts by weight, the surface roughness becomes too large and the space factor lowers, so that when such a drawback is not desirable, the amount is preferred to be less than 15 parts by weight. Considering these results, the compounding ratio of the particle separating resin is preferred to be 1-30 parts by weight based on 100 parts by weight of $CrO_3$ and in order to obtain the best result, the amount is preferred to be 5-15 parts by weight.

As seen from FIG. 2, when only the particle separating resin is added to the aqueous solution of chromic acid as the resin within the range in which the stripe patterns are not formed, that is in the case of less than 15 parts by weight, even if the improvement of the punchability can be observed, the punchability of a high degree exceeding 1,000,000 times cannot be obtained. This is because when only the particle separating resin is added to the aqueous solution containing chromic acid, said resin forms fine agglomerates and is not dissolved in said aqueous solution, so that the solution portion in the formed treating liquid does not substantially contain said resin. When such a treating liquid is applied on the steel sheet, the fine agglomerates form convex portions of the formed coating and the coating of the other portion does not substantially contain the resin. Accordingly, when the compatible resin is compounded in an amount of not less than 5 parts by weight, the punchability is suddenly improved. In this case, when the compounding amount of the particle separating resin is less than 5% based on the total amount of both the particle separating resin and the compatible resin, the coating having the desired surface roughness cannot be formed and the high rate of weldability cannot be obtained.

When the compounding amount of the compatible resin becomes too great, the punchability is rather deteriorated and further the weldability and the heat resistance lower, so that the compounding ratio of the compatible resin is preferred to be less than 120 parts by weight based on 100 parts by weight of $CrO_3$. The particularly preferable range in view of the punchability, weldability and heat resistance is 10-50 parts by weight of the compatible resin.

The aqueous solutions of chromates to be used in the present invention include the aqueous solutions of at least one chromates or dichromates of divalent or trivalent metals of magnesium, calcium, zinc, aluminum and the like to the aqueous solutions of chromic acid added thereto. For example, when a dichromate solution is prepared from a divalent metal oxide and $CrO_3$, if $CrO_3$ is added in an amount of more or less larger than the stoichiometric quantity, the stability of the treating liquid, when the resins are added, is higher. Furthermore, boric acid or phosphoric acid compounds may be added to the aqueous solution of chromates.

The concentration of these aqueous solutions of chromates must be 3-40% as $CrO_3$. When the concentration of $CrO_3$ is lower than 3%, even if the particle separating resin is compounded, the agglomerated particles having an average particle size of not less than 3 $\mu$ is not formed in substantial amounts, while when said concentration exceeds 40%, the agglomerates having a macrodiameter are formed.

In the treating liquids containing chromates, a reducing agent of $CrO_3$ is compounded but in the treating liquids in which an organic resin is compounded, the resin has an ability for reducing $CrO_3$, so that it is not always necessary to add the reducing agent. However, if the coating formed after baking absorbs moisture, it is preferable to add polyhydric alcohols and saccharides, such as ethylene glycol, glycerine, sugar and glucose as a reducing agent.

Although the compounding amount of these substances depends upon the compounding amount of the resins, 10-60 parts by weight based on 100 parts by weight of $CrO_3$ in the aqueous solution containing chromic acid is preferred.

The steel sheets aimed at in the present invention may be anyone which can be used as the electrical steel sheets and it is not necessary to adjust the surface roughness. As the pre-treatment, any specific treatment is not necessary, unless a large amount of oil or rust is deposited.

In the preparation of the treating liquid, while stirring an aqueous solution of a chromate containing about 3-40% of $CrO_3$, a given amount of the particle separating resin emulsion having a concentration of the nonvolatile matter of the resin being 50-60% is added thereto and then the compatible resin, if necessary, a reducing agent of the above described polyhydric alcohol or saccharide are added. The compounding order may be varied.

The method for coating and baking the treating liquid of the present invention is identical to the general method for coating and baking the treating liquid. Namely, the electrical steel sheet is dipped in the treating liquid or poured and then the coated steel sheet is squeezed by grooved rolls to adjust the thickness of the coating and then baked in a furnace at a temperature of 300°-700° C for an appropriate time. In the treating liquid, the fine agglomerates are dispersed in the treating liquid but unless the concentration of the treating liquid is a low concentration, such as lower than 3%, the precipitation is not substantially noticed and it is not particularly necessary to stir.

The following examples are given for the purpose of illustration of this invention and are not intended as limitations thereof. In the examples, "part" and "%" mean by weight.

EXAMPLE 1

An acrylic resin having a monomer composition composed of 82 parts of methyl methacrylate, 10 parts of butyl acrylate and 8 parts of methacrylic acid was used as a particle separating resin. To 100 ml of an emulsion of this resin, whose concentration of nonvolatile matter was 42%, was added 100 l of water to prepare a diluted resin emulsion having a concentration of nonvolatile matter of 21%.

To 100 l of a 32% aqueous solution of magnesium dichromate (concentration as $CrO_3$ is 26.6%) was added gradually 20l of the above diluted resin emulsion (the amount of nonvolatile matter of the particle separating resin emulsion is 12 parts based on 100 parts of $CrO_3$) under stirring to separate out particles, and further to the resulting mass were added 10 l of a compatible acrylic resin emulsion having a concentration of nonvolatile matter of 50% (trademark Voncoat 4001) (the amount of nonvolatile matter of the compatible resin emulsion is 14 parts based on 100 parts of $CrO_3$), 5 l of ethylene glycol (16 parts based on 100 parts of $CrO_3$), 5 kg of boric acid (15 parts based on 100 parts of $CrO_3$) and 300 l of water to prepare a treating dispersion.

An electrical steel strip of 0.5 mm thickness and 940 mm width containing 0.32% of Si and having a surface roughness of 0.9 $\mu H_{max}$ was immersed in the treating dispersion at a rate of 60 m/min, squeezed by means of grooved rubber rolls and baked in a hot-air furnace kept at 400° C for 60 seconds to obtain a coating having no gloss and stripe pattern.

Properties of the resulting coating are shown in the following Table 1 together with properties of the coatings formed in the following Examples and Comparative Examples.

EXAMPLE 2

A vinyl acetate-ethylene copolymer having a monomer composition of vinyl acetate : ethylene = 80 : 20 was used as a particle separating resin, in the form of an emulsion, whose concentration of a nonvolatile matter was 55%. To 100 l of a 30% aqueous solution of calcium dichromate (concentration as $CrO_3$ is 23.4%) was added gradually 4 l of the above resin emulsion (the amount of nonvolatile matter of the particle separating resin emulsion is 6 parts based on 100 parts of $CrO_3$) under stirring to separate out particles. Then, to the mass were added 40 l of a compatible acrylicstyrene resin emulsion having a concentration of nonvolatile matter of 40% (trademark Voncoat 4280) (the amount of nonvolatile matter of the compatible resin emulsion is 48 parts based on 100 parts of $CrO_3$) and 300 l of water to prepare a treating dispersion.

An electrical steel strip of 0.5 mm thickness and 940 mm width containing 0.32% of Si and having a surface roughness of 1.4 $\mu H_{max}$ was immersed in the treating dispersion at a rate of 80 m/min, squeezed by means of grooved rubber rolls and baked in a hot-air furnace kept at 500° C for 45 seconds to obtain a coating having no gloss and stripe pattern.

EXAMPLE 3

An acrylic resin having a monomer composition of methyl methacrylate:ethyl acrylate:methacrylic acid = 70:20:10 was used as a particle separating resin. To 100 l of an emulsion of this resin, whose concentration of nonvolatile matter was 43%, was added 200 l of water to prepare a diluted resin emulsion having a concentration of nonvolatile matter of 14.3%.

To 100 l of a 29% aqueous solution of zinc dichromate (concentration of $CrO_3$ is 20.6%) was added gradually 160 l of the above diluted emulsion (the amount of nonvolatile matter is 83 parts based on 100 parts of $CrO_3$) under stirring to separate out particles, and further to the mass were added 2 l of glycerin (11 parts based on 100 parts of $CrO_3$), 5 kg of boric acid (18 parts based on 100 parts of $CrO_3$) and 250 l of water to prepare a treating dispersion.

An electrical steel strip of 0.5 mm thickness and 940 mm width containing 0.92% of Si and having a surface roughness of 1.5 $\mu H_{max}$ was coated at a rate of 30 m/min, and the above prepared treating dispersion was sprayed on the steel strip, squeezed by means of grooved rubber rolls and baked in a hot-air furnace kept at 350° C for 120 seconds to obtain a coating having no gloss and stripe pattern.

COMPARATIVE EXAMPLE 1

To 100 l of a 30% aqueous solution to calcium dichromate were added, while stirring, 20 l of the same compatible acrylic resin emulsion as used in Example 1 (the amount of the nonvolatile matter of the resin emulsion is 28 parts based on 100 parts of $CrO_3$), 7 l of ethylene glycol (17 parts based on 100 parts of $CrO_3$) and 300 l of water to prepare a treating liquid.

The resulting treating liquid was applied on an electrical steel strip (thickness 0.5 mm, width 940 mm, Si content 0.30%, surface roughness 1.4 $\mu H_{max}$) at a rate of 60 m/min by means of grooves rubber rolls, baked in a hot-air furnace kept at 400° C for 60 seconds to obtain a glossy coating having a uniform appearance.

COMPARATIVE EXAMPLE 2

To 100 l of a 18% aqueous solution of calcium dichromate were added 5 l of ethylene glycol and a very small amount of a surfactant to prepare a treating liquid. The treating liquid was applied to the same electrical steel strip as used in Comparative Example 1 and treated in the same manner as described in Comparative Example 1 to obtain a uniform glossy coating.

COMPARATIVE EXAMPLE 3

In 100 l of a 35% aqueous solution of magnesium primary phosphate were dissolved 6 kg of $CrO_3$ and 10 kg of $Al(NO_3)_3 \cdot 9H_2O$, and then 100 l of water was added to the solution to prepare a treating liquid.

The treating liquid was applied to the same steel strip as used in Comparative Example 1 and treated at a rate of 60 m/min by means of grooved rubber rolls and baked in an electric furnace kept at 450° C for 60 seconds to obtain a glossy colorless transparent coating.

Photographs of the cross-section and surface of the coatings obtained in Examples 1 and 2 are shown in FIGS. 4, (a), (b), (c) and (d), comparison, photographs of the cross-section and surface of the conventional coating obtained in Comparative Example 1, that is, obtained by using a treating liquid, which has been prepared by compounding only a compatible resin to an aqueous chromic acid solution, are shown in FIGS. 4, (e) and (f).

The conventional coating obtained by using an aqueous chromic acid solution compounded with only a compatible resin is very smooth, while the coating according to the present invention is rough. That is, the coating of Comparative Example 1 had a surface roughness of 1.3 $\mu H_{max}$, while the coatings of Examples 1, 2 and 3 has surface roughnesses of 4.3, 3.4 and 6.8 $\mu H_{max}$, respectively.

It can be seen from the photograph of the surfaces of coatings shown in FIGS. 4 (b) and (a) that the coating according to the present invention contains a large number of deposited particles.

It can be seen from Table 1 that the coating according to the present invention has a very high insulation resistance, is excellent in the adhesion and in the heat resistance and does not exfoliate after stress relief annealing.

Figure 5:
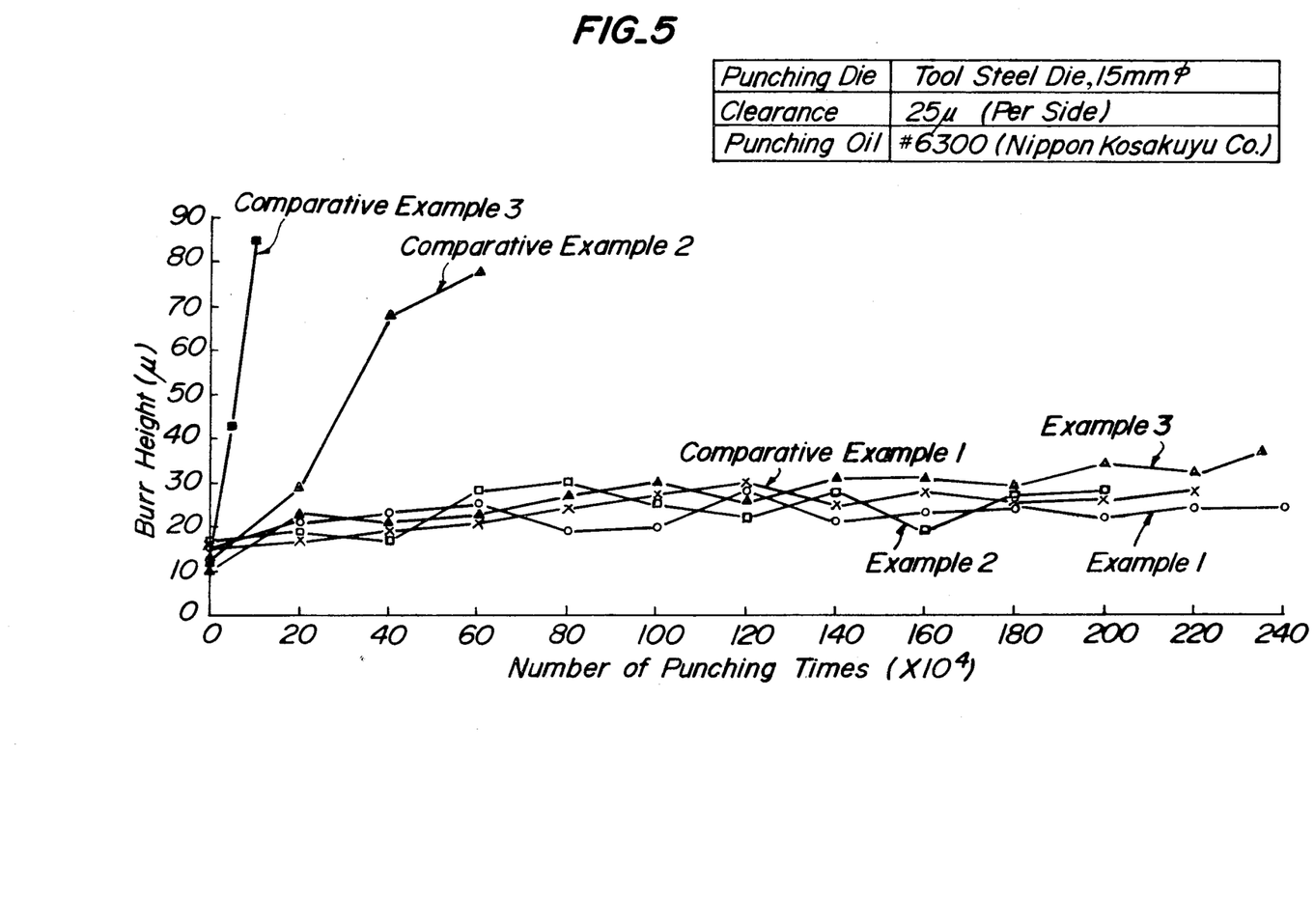
FIG. 5 illustrates a graph showing a comparison between the punchability of the coated steel strips according to the present invention and that of conventional coated steel strips.

The coated steel strips according to the present invention can be welded at a high speed and further are excellent in the punchability as shown in FIG. 5.

In the present invention, the weight of the coating should be 1.2–4.8 g/m² per one side. When the coating weight is less than 1.2 g/m², the punchability and insulation resistance of the coated steel strip are poor. While, when the coating weight exceeds 4.8 g/m², the space factor of the coated steel strip is deteriorated.

Table 1

| Properties of coatings and coated steel strips | | Example | | | Comparative Example | | |
|---|---|---|---|---|---|---|---|
| | | 1 | 2 | 3 | 1 | 2 | 3 |
| Surface roughness | ($\mu H_{max}$) | 4.3 | 3.4 | 6.8 | 1.3 | 1.5 | 1.6 |
| Coating weight after baking | (gm/m² per side) | 2.6 | 2.7 | 2.9 | 2.6 | 2.5 | 2.4 |
| Insulation resistance* | ($\Omega$-cm²/layer) | | | | | | |
| Before annealing | | 53 | 32 | 310 | 9 | 7 | 5 |
| After annealing at 750° C in $N_2$ | | 23 | 18 | 60 | 1.8 | 0.7 | 0.5 |
| Punchability** (Number of punching times) | | >240×10⁴ | >200×10⁴ | >230×10⁴ | >220×10⁴ | 30×10⁴ | 6×10⁴ |
| Weldability*** | (cm/min) | 130 | 100 | 120 | 20 | 50 | 100 |
| Adhesion**** | (mm$\phi$) | | | | | | |
| Before annealing | | <10 | <10 | <10 | <10 | <10 | 15 |
| After annealing at 750° C in $N_2$ | | 15 | 15 | 15 | 15 | 15 | 40 |
| Corrosion resistance***** | (%) | 0 | 0 | 5 | 0 | 20 | 40 |
| Space factor* | (%) | 98.8 | 99.0 | 98.4 | 99.1 | 99.0 | 99.1 |

*Measured according to ASTM A-344.
**The punchability is shown by the number of punching times until the burr height reaches 50 $\mu$ when a coated steel strip is punched by means of a tool steel die.
***Maximum welding velocity, at which no blowhole is formed.
****Maximum bending diameter, at which exfoliation of coating is observed.
*****Rusted area after 10 hours in the salt spray test.

What is claimed is:

1. A method for producing coated electrical steel sheets having excellent punchability, weldability and insulation characteristics comprising applying on an electrical steel sheet, a treating dispersion obtained by compounding:
   a. a resin emulsion which separates agglomerated particles having an average particle diameter of 3–40 microns when compounded in an aqueous solution containing chromic acid;
   b. a resin compatible with an aqueous solution containing chromic acid; and
   c. an aqueous solution containing chromic acid so that the total amount of non volatile matter of both the resins is 5–150 parts by weight per one hundred parts of chromic acid by weight expressed as $CrO_3$ with the amount of the resin emulsion being at least one part by weight of the total weight amount of the resin and resin emulsion and said resin emulsion provides at least 5% by weight of the total amount of the non volatile matter of the resin and the resin emulsion; and baking the thus treated steel sheets.

2. The method as claimed in claim 1 in which the treating dispersion includes 10–60 parts by weight based upon one hundred parts by weight of chromic acid of at least one member of the group consisting of polyhydric alcohols and saccharides as a reducing agent.

3. The method as claimed in claim 1 wherein said particle separating resin is added in an amount such that the non volatile matter of said resin is 1–30 parts by weight per one hundred parts by weight of chromic acid.

4. The method as claimed in claim 1 wherein said compatible resin is added in an amount such that non volatile matter of said resin is 5–120 parts by weight per one hundred parts by weight of chromic acid.

5. The method as claimed in claim 1 wherein the particle separating resin is added in the amount of 5–15 parts by weight and the compatible resin at 10–50 parts by weight per one hundred parts by weight of chromic acid.

6. The method as claimed in claim 1 wherein at least one member of the group consisting of boric acid and phosphoric acid is added.

7. The method as claimed in claim 1 wherein the baking temperature is 300°–700° C.

8. The method as claimed in claim 1, wherein the particle separating resin is an acrylic resin emulsion obtained by copolymerizing 5–13 parts by weight of $\alpha,\beta$-ethylenically unsaturated carboxylic acid and 95–87 parts by weight of $\alpha,\beta$-ethylenical monomer together with at least one emulsifiers added with 0.8–5.5 parts by weight as based on 100 parts by weight of the nonvolatile matter in the emulsion, of a water soluble amine.

9. The method as claimed in claim 1, wherein the compatible resin is an acrylic resin containing less than 5 parts by weight based on 100 parts by weight of the total monomers of $\alpha,\beta$-ethylenically unsaturated carboxylic acid and less than 0.5 part by weight based on 100 parts by weight of the non volatile matter in the emulsion, of a water soluble amine.

10. The method as claimed in claim 1 wherein the chromate salt is selected from at least one member of the group consisting of calcium, magnesium, zinc and aluminum chromate salts.

11. The method as claimed in claim 1, wherein a concentration of the non volatile matter of the particle separating resin emulsion, when said emulsion is added to an aqueous solution containing chromic acid, is 5–60%.

12. The method as claimed in claim 1, wherein the aqueous solution contaning chromic acid containing free $CrO_3$.

13. The method as claimed in claim 1 wherein the weight of the coating is 1.2–4.8 g/m² per one side.